United States Patent
Nimmo

[15] 3,697,028
[45] Oct. 10, 1972

[54] CLIPS

[72] Inventor: Neil Duncan Nimmo, Strawberry House, Square Drive, Kingsley Green, England

[22] Filed: May 9, 1969

[21] Appl. No.: 823,444

[30] Foreign Application Priority Data

May 27, 1968    Great Britain ........25225/68
July 17, 1968   Great Britain ........34007/68
Nov. 21, 1968   Great Britain ........55350/68

[52] U.S. Cl. ..................248/121, 24/257, 287/2, 52/238, 248/351, 52/243, 108/153
[51] Int. Cl. ......A47g 29/02, A44b 21/00, E04h 1/00
[58] Field of Search...24/257, 259 C, 255 C, 255 AS, 24/255 SL, 255 W; 248/73, 74; 52/243, 481, 714, 489, 238; 211/182, 177, 178, 148; 248/121, 159, 951, 356; 108/153, 146; 287/DIG. 8, 178; 285/178

[56] References Cited

UNITED STATES PATENTS 3,285,554  11/1966  Voelkerding..............248/121
3,322,381  5/1967   Bubb........................248/121
295,379    3/1884   Coburn......................24/257
2,963,761  12/1960  Haydock..................24/257 R
3,313,009  4/1967   Beckerer..................24/257 R
3,330,517  7/1967   Zimmermann ..........248/74 X

FOREIGN PATENTS OR APPLICATIONS 1,477,777  3/1967   France......................248/74
894,867    4/1962   Great Britain..............248/74
1,078,193  8/1967   Great Britain..........24/257 R

*Primary Examiner*—Bernard A. Gelak
*Attorney*—Hall & Houghton

[57] ABSTRACT

A clip which can be snapped-on to a tube, the clip having an arcuate gripping part and a foot. The clip may be made of aluminum alloy and the tube can have an oval passageway which can co-operate with an oval cam-locking tube for use in joining two tubes together. The aluminum alloy clip may be made by extrusion.

5 Claims, 13 Drawing Figures

PATENTED OCT 10 1972

NEIL D. NIMMO,
INVENTOR

BY Hull & Knight
ATTORNEY

PATENTED OCT 10 1972 3,697,028

NEIL D. NIMMO,
INVENTOR

BY Hull & Knight

ATTORNEY

CLIPS

This invention relates to clips, and has particular, but not exclusive, reference to constructional clips.

According to the present invention, there is provided a clip securable to a cylindrical member which clip comprising a resilient arcuate portion and a foot, the resilient arcuate portion being co-operable with the cylindrical member, and subtending an angle at the center of the arcuate portion greater than 180°.

The cylindrical member may be of substantially circular cross-section, and the resilient arcuate portion of the clip may be substantially an arc of a circle. The clip may be a metal clip and the metal may be an alloy of aluminum.

The alloy may include magnesium in the percentage range 0 to 1 percent, manganese in the percentage range 0 to ¾silicon in the percentage range ½ to 1 percent and aluminum to 100 percent.

The alloy composition may be magnesium ⅝ percent, manganese ½ percent, silicon 1 percent and aluminum 97⅞ percent. The alloy may be solution and/or precipitation treated.

The thickness of the arcuate portion may be substantially constant. The angle subtended by the arcuate portion may be in the range 235° ± 35°, and may be, more particularly, in the range 215° ± 30°. There may be a waist between the arcuate portion and the foot.

The arcuate portion and the foot may be of integral construction, and the foot may have a surface engageable with, when in use, a flat surface, the arrangement being such that, in use, the flat surface may be supported in a plane parallel to a tangential plane of a cylindrical member to which the clip may be secured. The surface of the foot may be perpendicular to that diameter of the arcuate portion which extends through one end of the foot, when seen in cross-section. The width of the foot may be substantially equal to the diameter of the arcuate portion of the clip.

The foot may be engageable in a shoe, the width of the shoe being substantially equal to the diameter of the arcuate portion of the clip. The clip may have a longitudinal channel formed in the inner surface of the arcuate portion adjacent the foot. There may be a waist between the foot and the arcuate portion.

The clip may be in combination with the cylindrical member, and the cylindrical member may be of circular cross-section. The arcuate portion may be an arc of a circle of a size such that it can be snapped-on to the cylindrical member to grip the cylindrical member.

The cylindrical member may be a tube having a circular cross-sectional passageway. The cylindrical member may be a tube having an oval cross-sectional passageway. There may be provided a further extended member of oval external cross-section, the further extended member being adapted and arranged to fit inside the cylindrical member, such that relative rotation of the further extended member and the cylindrical member locks the further extended member to the cylindrical member.

The clip of the combination may also be a metal clip, and the metal may be an alloy of aluminum. The alloy may include magnesium in the percentage range 0 to 1 percent, manganese in the percentage range 0 to ¾ percent, silicon in the percentage range ½ to 1 percent and aluminum to 100 percent. The composition of alloy of the clip may be magnesium ⅝ percent, manganese ½ percent, silicon 1 percent, and aluminum 97⅞ percent. The aluminum alloy clip of the combination may be solution and/or precipitation treated.

The cylindrical member may be formed of an aluminum alloy.

The ratio of the thickness of the arcuate portion of the clip to the diameter of the tube may be in the range 15 to 25.

The length of the clip may be greater than or equal to one inch (25.4 mm.).

The clip may be provided with a locking member pivotally mounted on a first leg of the arcuate portion and being lockable, when in use, to a second leg of the arcuate portion. The locking member may be an arcuate locking member, and the pivoting position of the locking member on the arcuate portion may be diametrically opposed to the locking position on the arcuate portion.

There may be provided a lip on each leg of the arcuate portion, each lip co-operable with a corresponding lip on each end of the locking member, the arrangement being such that, the lips on the locking member intermesh, when in use, with the lips on the arcuate portion of the clip.

The clip may be formed of anodized aluminum alloy.

The present invention also provides a method of making a clip, which clip comprising a resilient arcuate portion and a foot, the resilient arcuate portion being securable to and co-operable with a cylindrical member, the resilient arcuate portion subtending an angle greater than 180°at the center thereof, which comprises the steps of extruding a length of material through a die having an orifice defining the arcuate portion and the foot, and cutting off a length of the material to form the clip.

The method may be used to form a clip of an aluminum alloy. The thickness of the arcuate portion of the clip may be substantially constant. The angle subtended by the arcuate portion of the clip may be in the range 235° ± 35° and, more particularly, may be in the range 215° ± 30°. The width of the foot may be substantially equal to the width of the clip, and the clip may be formed with a longitudinal channel in the inner surface of the arcuate portion adjacent the foot.

By way of example only, embodiments of the invention will now be described with reference to the accompanying drawings, of which:

Figure 5:
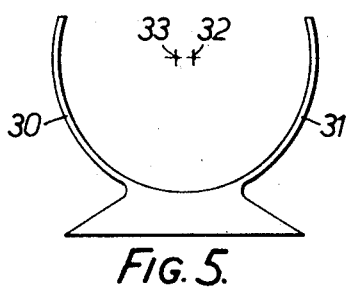
Figure 6:
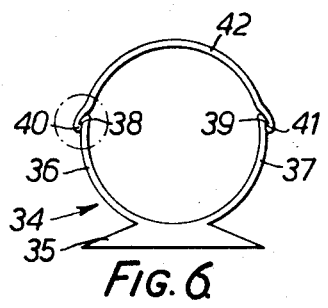
Figure 7:
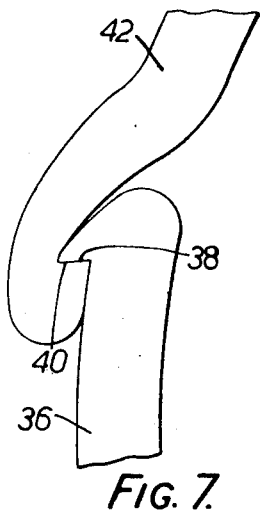
Figure 8:
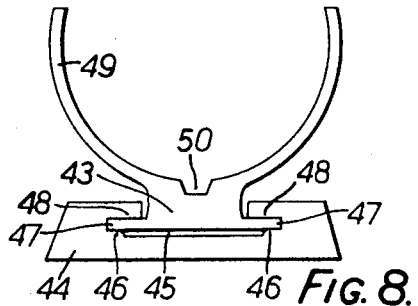
Figure 9:
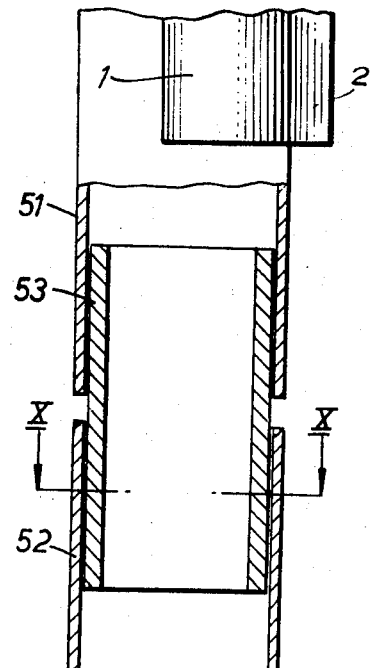
Figure 10:
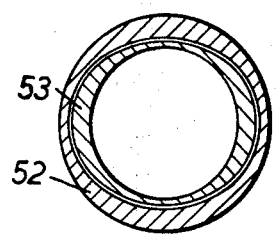
Figure 12:
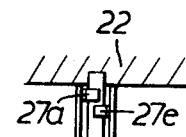
Figure 11:
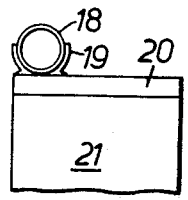
Figure 13:
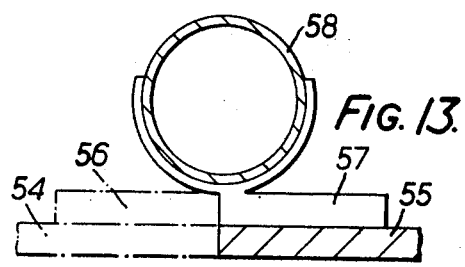

FIGS. 5, 6, and 8, are end elevations of further embodiments;

FIG. 7 is an enlarged view of that portion of FIG. 6 inside the dotted circle;

FIG. 9 is an elevation partly in cross-section of two cylindrical members, one having a clip snapped thereon, and a further oval member;

FIG. 10 is a cross-section along the line X — X of FIG. 9;

FIG. 11 is a plan view of a shelf support incorporating a clip of the present invention;

FIG. 12 is a side elevation of a partition including clips of the present invention; and FIG. 13 is a plan view of a joint in the partition of FIG. 12.

Figure 1:
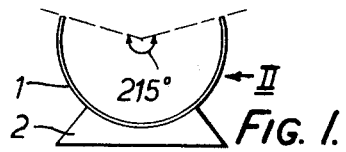
FIG. 1 is an end elevation of one embodiment of the invention.

Referring to FIGS. 1 to 4, the clip comprises an arcuate portion 1 and a foot 2. In the unexpanded position, as shown in FIG. 1, the arcuate portion forms an arc of a circle subtending an angle of 215° at the center of the circle. The arcuate portion and the foot may be formed separately, in which case the portion 1 can be cut from a tube, and the foot can be extruded moulding which can be secured to the portion 1 with a suitable adhesive, for example an epoxy resin. Preferably, however, the clip is made by extruding a single section and a length of the section is cut off to form a clip.

A clip in which the arcuate portion 1 is of 1¼ inches (31.75 mm.) external diameter, with walls 0.064 inches (1.63 mm.) has been made in an aluminum alloy of composition silicon 1 percent, magnesium ⅝ percent, manganese ½ percent, and aluminum 97⅞ percent. These clips have a high resistance to fatigue if they are solution treated (heated to 500° C and rapidly cooled by water quenching) and then precipitation treated (reheated for a period of time at 120° C – 200° C). Other alloys have been tried, an alloy of silicon 1 percent, magnesium ⅝ percent, and aluminum 98⅜ percent has a poor fatigue strength in the unheat-treated condition.

The clips have been tried on aluminum alloy and steel tubes, and work satisfactorily on both. However, aluminum alloy tubes are, for the same dimensions, less than half the weight of steel tubes, and a further virtue of certain aluminum alloys is that they can be anodized. Anodizing enables a very good finish to be applied to both the clip and the tube, and a color may be added to the oxide film for decorative purposes.

The arcuate portion 1 and the foot 2 are tapped with a hole 3 which is countersunk, 4, into the portion 1. In normal use the clip is secured to a flat surface by passing a screw or bolt (not shown) through the hole 3. The head of the screw or bolt is so shaped as to be able to sink below the inner surface of the portion 1 into the countersunk hole. The screw or bolt can also serve the additional purpose of holding together the arcuate portion 1 and the foot 2, in the arrangement in which they are not in an integral unit.

The clip is secured to a tube 5, by simply snapping it onto the tube. Any one size of clip can only be used satisfactorily on a limited range of tube sizes. For example, an aluminum alloy pipe, Duralumin, of 1.25 inches (31.75 mm.), and with walls 0.064 inches (1.63 mm.) is securely held by an aluminum alloy clip, Duralumin having a circular arcuate portion with an integral diameter 1.122 inches (31.5 mm.), and 9 wall thickness of 0.064 inches (1.63 mm.) in the unexpanded condition. The length of the clip is a matter of choice, the longer the clip the greater the holding power, but clips 1¼ inch in length have been found to be satisfactory.

The circular clip can be secured in any position around and along the length of a circular tube, and is equally stable in any position.

Although the inner surfaces of the clips and the outer surface of the tube are shown to be smooth in the accompanying drawings they may be ridged or formed with other surface patterns.

The clip illustrated in FIG. 1 has an arcuate portion which is substantially the arc of a circle. However, an alternative arrangement of the arcuate portion can be that shown in FIG. 5. The two legs 30 and 31 of the clip are arcs of circles with the same internal radius as the external radius of the tube to which the clip is attachable. The centers of the arc are however displaced, 32 being the center of the arc of leg 30, and 33 being the center of arc of leg 31. This enables the clip to grip a tube to which it is attached.

The clip may be provided with a locking member to restrain any tube inside the clip. In FIGS. 6 and 7, the clip 34 has a foot 35, and two legs 36, 37 which form the arcuate portion. The ends of the legs are formed with lips 38, 39, which co-operate with corresponding lips 40 and 41 formed on the ends of the locking member 42.

To use the clip, it is snapped-on to a tube, and the locking member has one lip, 41 fitted to the corresponding lip 39. The locking member is then pivoted around the latter lip, and the lip 40 is engaged beneath the lip 38, thus securing the locking member over the tube.

FIG. 8 illustrates a clip in which the foot 43 is mountable in a shoe 44. The shoe has a longitudinal passageway 45 with longitudinal ridges 46 to hold the flanges 47 of the foot against the upper portions 48 of the shoe. The arcuate portion 49 may be formed in any of the ways described above. A channel 50 is formed in the center of the arcuate portion adjacent the foot, and can be used as a guide if the clip has to be bored to accept a bolt. The trough would also, in such a case, act as a countersink for the bolt.

FIGS. 9 and 10 illustrates an arrangement whereby two lengths of tube can be joined together. Both the tubes 51, and 52, have a circular external cross-section and an oval internal cross-section. The inner tube 53 has an oval external cross-section and a circular internal cross-section. To join the two tubes 51 and 52 together, a piece of the oval tube is put into their cores, as shown in FIG. 12, and the tube 51 is rotated relative to the tube 52. This relative rotation carries with it the internal oval tube 53, and jams the oval tube 53 against the inside of both the tubes 51 and 52. The two tubes are thus held together, and can transmit considerable loads, especially thrust loads. The resistance of the joint to bending stresses may be increased by increasing the length of the inner oval tube 55.

Figure 2:
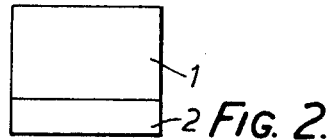
FIG. 2 is a side view along the arrow II of FIG. 1.
Figure 3:
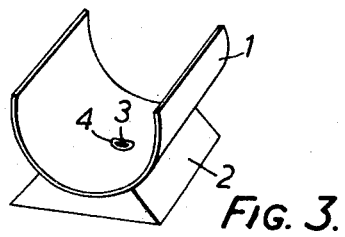
FIG. 3 is a perspective view of the embodiment of FIG. 1.
Figure 4:
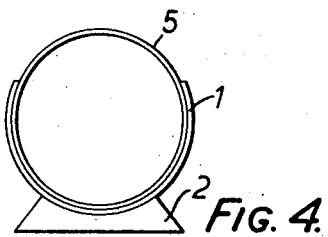
FIG. 4 is an end view of the embodiment of FIG. 1 when in use.

The ends of the tubes 51 and 52 need not be in an abutting relationship, and they can be moved apart by any distance, provided the oval tube 53 is long enough, to make a tube unit of a variable length. A clip having arcuate portions 1 and a foot 2, as in FIG. 2, is shown snapped onto the tube 51, as previously described.

The clip may be used for making permanent joints, or for use in situations where it is easily dismantled or assembled. In its permanent role it could be used in the construction industry for such uses as securing electrical conduit pipe or water pipes to walls or other supports or for the erection of partitioning in offices. In its temporary role, the clip would find applications for such things as the erection of display fittings for exhibitions or shop windows.

A stand or bookshelf can be made up as shown in FIG. 11. A tube 18 has snapped onto it a clip 19 to which is connected a bracket 20. The bracket 20 supports a shelf 21. By arranging the bracket in the manner shown in the drawing, the slight bending of the shelf which occurs on loading tends to result in a force which pushes the clip onto the tube, thus enhancing the gripping power of the clip on the tube.

FIGS. 12 and 13 illustrate a partition which extends between a ceiling 22 and a floor 23. A tube 24 is secured to the ceiling and floor, either by being built in as shown, or by being secured to the ceiling and floor by pipe clamps. Secured to one side of the tube 24 is a partitioning board 25, and secured to the other side is a further partitioning board 26. The boards are secured by the clips 27a, 27b, 27c, 27d, 27e and 27f. The clips are screwed to the boards 25 and 26, and the clips are staggered vertically to ensure that they do not interfere with one another. This type of partitioning has a built-in air-gap 28 which can be left empty or can be filled with an insulating material, for example glass-fiber. The air-gap helps to reduce the sound transmission across the partition, and also gives enhanced thermal insulation characteristics to the partition.

FIG. 13 shows an arrangement which enables the partitioning boards to be abutted. The two partitioning boards 54 and 55 each have a series of clips 56, 57 secured to them. The clips are securable to a tube 58 and are staggered along the length of the tube. It can be seen that the clip 57 is no way interferes with the partitioning board 54 and does not overlap it at all. This enables boards of slightly different thickness to be used with clips of slightly different foot thicknesses to produce an even external surface.

This partitioning arrangement could be used in restaurants etc. to provide an easily changeable wall covering. Additionally, back-drops or sets for theatres or in film sets or photographic studios can be rapidly erected and dismantled using the clips of the invention.

Other embodiments of the invention can be envisaged. For example, the foot need not be positioned diametrically opposite the opening in the arcuate portion, but could be positioned anywhere on the arcuate portion. A modular system using the clips and the tubes, including the oval tubes could be rapidly assembled and disassembled in a multitude of ways to produce arrangements of very large size.

It will be understood that the clip could be made of materials other than aluminum alloys, for example it could be made of titanium, stainless or other alloy steels, brass, bronze, glass-fiber or a magnesium alloy.

I claim:
1. A system comprising:
   a. at least one elongated externally cylindrical member formed of aluminum alloy and having an oval inner wall,
   b. a further member having an oval outer wall sized to slidingly engage within said oval inner wall in one position of relative rotation thereof and to jam within said oval inner wall on relative rotation of said members, and
   c. a clip formed of aluminum alloy and having a foot and a resiliently arcuate portion,
   d. said resiliently arcuate portion subtending an angle at the center thereof in the range of 210° ± 30° and being a snap-on fit onto said cylindrical member, and
   e. said foot providing means for securing the clip to a surface to be supported by engaging the clip with said internally oval externally cylindrical member.

2. A system as claimed in claim 1, wherein said resilient arcuate portion is of constant wall thickness.

3. A system as claimed in claim 1, wherein said resilient arcuate portion comprises a first leg and a second leg each in the form of an arc of a circle having an internal diameter equal to the external diameter of the externally cylindrical member, the centers of the arcs of the two legs being displaced from each other so as to move the two legs towards one another.

4. A system as claimed in claim 1, which comprises at least two of said externally cylindrical members each having an oval inner wall, and wherein said further member is sized to slidingly engage within the oval inner walls of adjacent ends of said externally cylindrical members when assembled therewith, and to jam therewith when relative rotation of said externally cylindrical members causes relative rotation of their oval walls with respect to said further member.

5. A system as claimed in claim 1, wherein the composition of the aluminum alloy clips consists essentially of magnesium 0 to 1 percent, maganese 0 to ¾ percent, silicon ½ to 1 percent and aluminum to 100 percent.

* * * * *